United States Patent [19]

Kasahara

[11] 4,419,923

[45] Dec. 13, 1983

[54] TOGGLE ASSEMBLY FOR VEHICLES OR CARS

[75] Inventor: Hiroshi Kasahara, Ueda, Japan

[73] Assignee: Nisshin Kogyo Kabushiki Kaisha, Nagano, Japan

[21] Appl. No.: 166,379

[22] Filed: Jul. 7, 1980

[30] Foreign Application Priority Data

Jul. 17, 1979 [JP] Japan .............................. 54-98442[U]
Jul. 31, 1979 [JP] Japan ............................ 54-105816[U]
Jul. 31, 1979 [JP] Japan ............................ 54-105817[U]
Aug. 30, 1979 [JP] Japan ............................ 54-119309[U]

[51] Int. Cl.³ ............................................. F15B 17/02
[52] U.S. Cl. ....................................... 91/460; 60/560; 60/556; 60/584; 60/593; 92/168
[58] Field of Search .................. 60/555, 556, 557, 560, 60/584, 593; 92/159, 168; 277/DIG. 4; 91/460

[56] References Cited

U.S. PATENT DOCUMENTS

| | | | |
|---|---|---|---|
| 2,014,887 | 9/1935 | Farmer | 92/159 |
| 2,398,252 | 4/1946 | Rockwell | 60/557 |
| 2,638,391 | 5/1953 | Heusser | 92/159 |
| 2,976,686 | 3/1961 | Stelzer | 60/556 |
| 3,099,941 | 8/1963 | Helvern | 60/555 |
| 3,381,591 | 5/1968 | Toschkoff | 92/168 |
| 4,116,115 | 9/1978 | Gross | 92/168 |
| 4,208,880 | 6/1980 | Horie | 60/556 |
| 4,313,303 | 2/1982 | Resch | 60/556 |

Primary Examiner—Abraham Hershkovitz
Attorney, Agent, or Firm—Cantor and Lessler

[57] ABSTRACT

A toggle assembly for vehicles or cars comprising a relay cylinder mounted on an end plate including a booster cylinder and an output cylinder, a control chamber arranged in coaxial relation to the relay cylinder, a control valve for controlling a gas by a hydraulic pressure of a master cylinder, said valve being arranged in operable association with the control chamber, and a booster piston disposed in the booster cylinder and in operable association with the controlled gas, wherein said end plate is provided with a shell for said booster cylinder as an integral piece, said shell is integrally provided with a first compressed air passage having its one end being open in the back chamber of the booster cylinder for the booster piston and its other end passing through said end plate and being open at the end of a relay valve body, and a second compressed air passage is provided to extend from a casing for said control chamber, said second passage having its one end in communication with the other open end of said first passage and its other end in communication with said control chamber.

4 Claims, 11 Drawing Figures

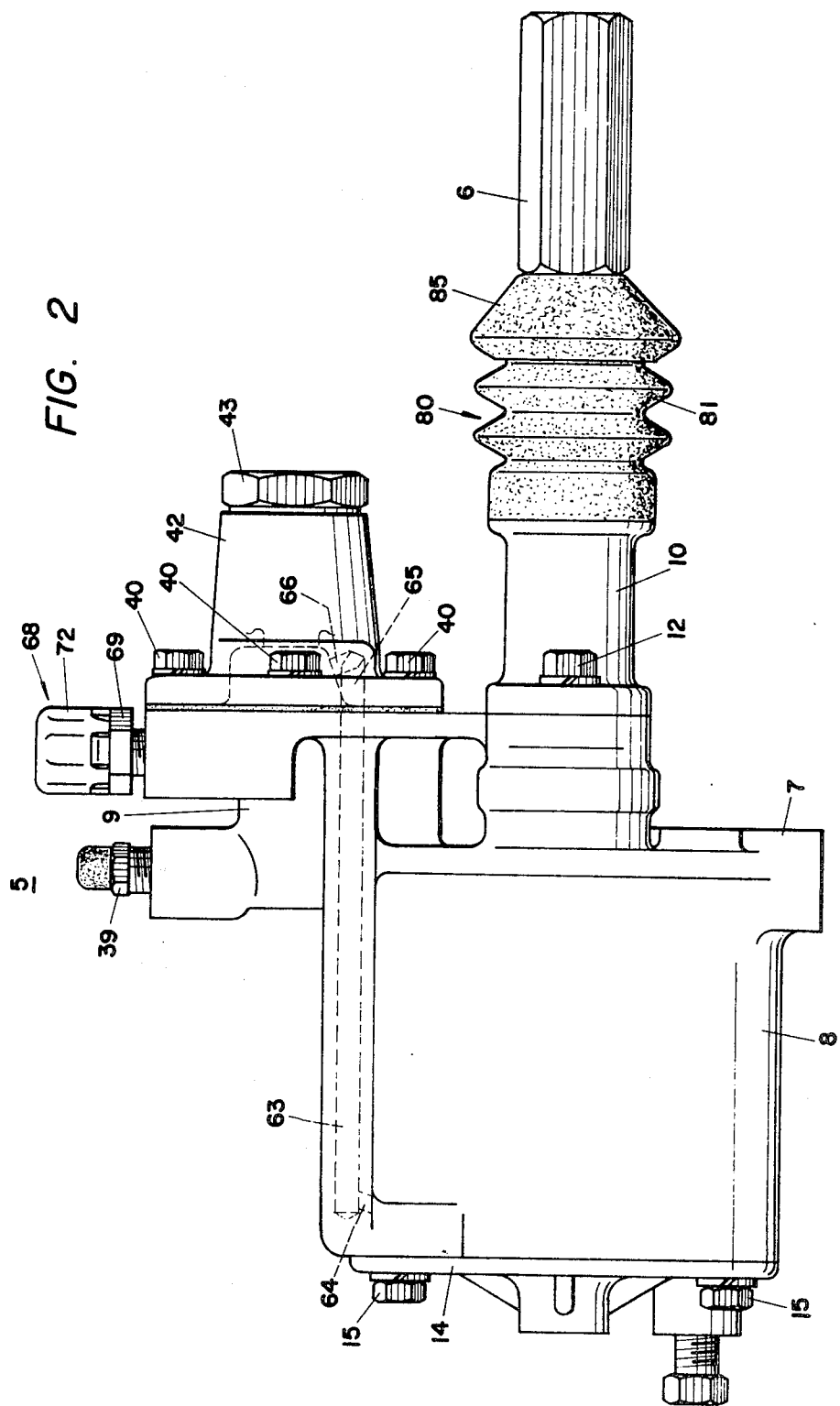

TOGGLE ASSEMBLY FOR VEHICLES OR CARS

BACKGROUND OF THE INVENTION

The present invention relates to a toggle assembly designed for vehicles or cars, which comprises a relay cylinder mounted on an end plate including a booster cylinder and an output cylinder, a control chamber mounted coaxially on the relay cylinder, a control valve arranged in operable association with the control chamber for regulation of a gas by a hydraulic pressure of a master cylinder, and a booster piston received in the booster cylinder and in operable association with the gas thus controlled.

In the prior art toggle device of the type as mentioned just above, a compressed air conduit for establishing communication between the control chamber and the back chamber of the booster cylinder for the booster piston is provided independently of the booster body. This conduit is connected to the control chamber by fixing it to a relay valve body through a O-ring by means of a suitable joint (bush), and is connected to the back chamber for the booster piston by welding it to the booster shell. In such an arrangement, compressed air at a pressure of 6 to 10 kg/cm$^2$ is admitted into the control chamber, and is then fed into the back chamber for the booster piston via the compressed air conduit. This offered problems such as a lowering of the sealing property and air leakage. The booster shell made by press-molding has also been found to be inferior in the tolerance of the internal dimension to the aluminium body made by casting; this has an adverse influence on the service life or durablility of an annular rubber seal positioned on the outer sliding surface of the booster piston.

In order to lubricate the outer sliding surface of the booster piston including the annular rubber seal, a lubricating oil is applied thereon during the assembling of the booster piston. As the piston is repeatedly reciprocated, however, the coated lubricating oil is often caused to collect on both ends of the outer sliding surface, so that the surface is not satisfactorily lubricated. As a result, the annular seal is spoiled to such an extent that the air-tightness maintained thereby is destroyed. This further leads to unsatisfactory operation of the master cylinder. In order to cope with these problems, an additional amount of the lubricating oil is made up for through a supply hole formed in the cylinder. In the case of an air cylinder of the type wherein the booster piston is horizontally reciprocated, however, the lubricating oil thus supplied collects merely in the lower portion of the cylinder and does not sufficiently reach the upper portion thereof. Thus, the above-mentioned problems remain still unsolved.

In the prior art arrangement, an air cleaner is provided at an exhaust port for discharging an off-gas such as waste compressed air into the relay valve body with a view to preventing dust, water and so on from entering the assembly. The air cleaner so far used includes a collar having therein an exhaust port and mounted on the upper end of a connector, a cap-shaped cover having its open end bent and fixed with respect to the collar, and a filter disposed within the cover. In such an arrangement, however, the exhaust port is readily clogged by mud etc. Especially in the case of a large-sized vehicle or car, the booster body is mounted on the underside of the car body while being open to the view, so that water and dust flung up by the front wheels enter the exhaust port and cause easy clogging of the filter. Under such a situation, it is impossible to discharge the compressed air from the front chamber of the booster cylinder. In addition, the inoperativeness of the booster then interrupts the operation of the clutch or increases the force necessary for working the brake pedal. Thus, the prior art air cleaner offers a serious problem in view of safety.

A water- and dust-proof boot is usually interposed between the output cylinder body and the output rod. As such a boot, a bellows has widely been used which is designed to extend and contract in response to the movement of the output push rod. The bellows is provided therein with a ventilation hole for preventing abnormal deformation or destruction thereof during the extension and contraction. Since rainwater and dust enter the bellows from the outside through the ventilation hole, however, the sliding portion between the output cylinder and the output push rod gets rusted and spoiled.

SUMMARY OF THE INVENTION

In view of the foregoing, it is therefore a primary object of the present invention to provide a toggle assembly for vehicles or cars wherein a booster body is integrally provided therein with a compressed air conduit for establishing communication between a control chamber and a back chamber of a booster cylinder divided by a booster piston, thereby eliminating the need of any joints or O-rings for connection of the compressed air conduit and resulting in a decrease in the number of the parts involved. With such an arrangement as contemplated in the present invention, it is possible to avoid a drop of the pressure difference between the control chamber and the back chamber for the booster piston and ensure smooth operation of a clutch. It is also possible to manufacture the booster body from the same material as used in the booster piston by casting. As a result, it is feasible to make drastic improvements in the accuracy of the sliding surface, the tolerance of the internal dimension and the shelf life or durability of an annular seal for the booster piston.

Another object of the present invention is to make drastic improvements in the function of a booster cylinder by supplying a lubricating oil on the outer sliding surface of a booster piston in a constant manner, thereby enhancing the air-tightness and durability of an annular seal.

A further object of the present invention is to make longer the length of an exhaust passage in the air cleaner and position laterally an exhaust gap by a peripheral rib such that the cover turns due to the vibration or rocking of a car body, thereby to prevent entrance of foreign matters, in particular mud from the outside into the gap and accumulation thereof in the interior of the gap for ensuring well ventilation.

A still further object of the present invention is to permit the interior of a water- and dust-proof boot interposed between the output cylinder and the output rod to communicate with the atmosphere through an expansion chamber such that the expansion chamber is allowed to prevent entrainment of foreign matters such as rainwater and dust from the outside.

Other objects and advantages of the present invention will become apparent from a reading of the following detailed description with reference to the accompanying drawings.

BRIEF DESCRIPTION OF THE DRAWINGS

FIGS. 1 to 9 show together one preferred embodiment of the toggle assembly according to the present invention, wherein:

FIG. 1 is a front view, longitudinally sectioned, of the embodiment;

FIG. 2 is a front view thereof;

FIG. 3 is a left-hand side view of FIG. 2;

FIG. 4 is a right-hand side view of FIG. 2;

FIG. 5 is a plan view of the cylinder body used for the toggle assembly according to the present invention;

FIG. 6 is a front view of the casing for the control chamber;

FIG. 7 is a perspective view of the cap-shaped cover;

FIG. 8 is a perspective view, partially cut away, of the cover in a caulked state; and FIG. 9 is a front view, longitudinally sectioned, of the water- and dust-proof boot in an assembled state.

DETAILED DESCRIPTION OF PREFERRED EMBODIMENTS

Figure 1:
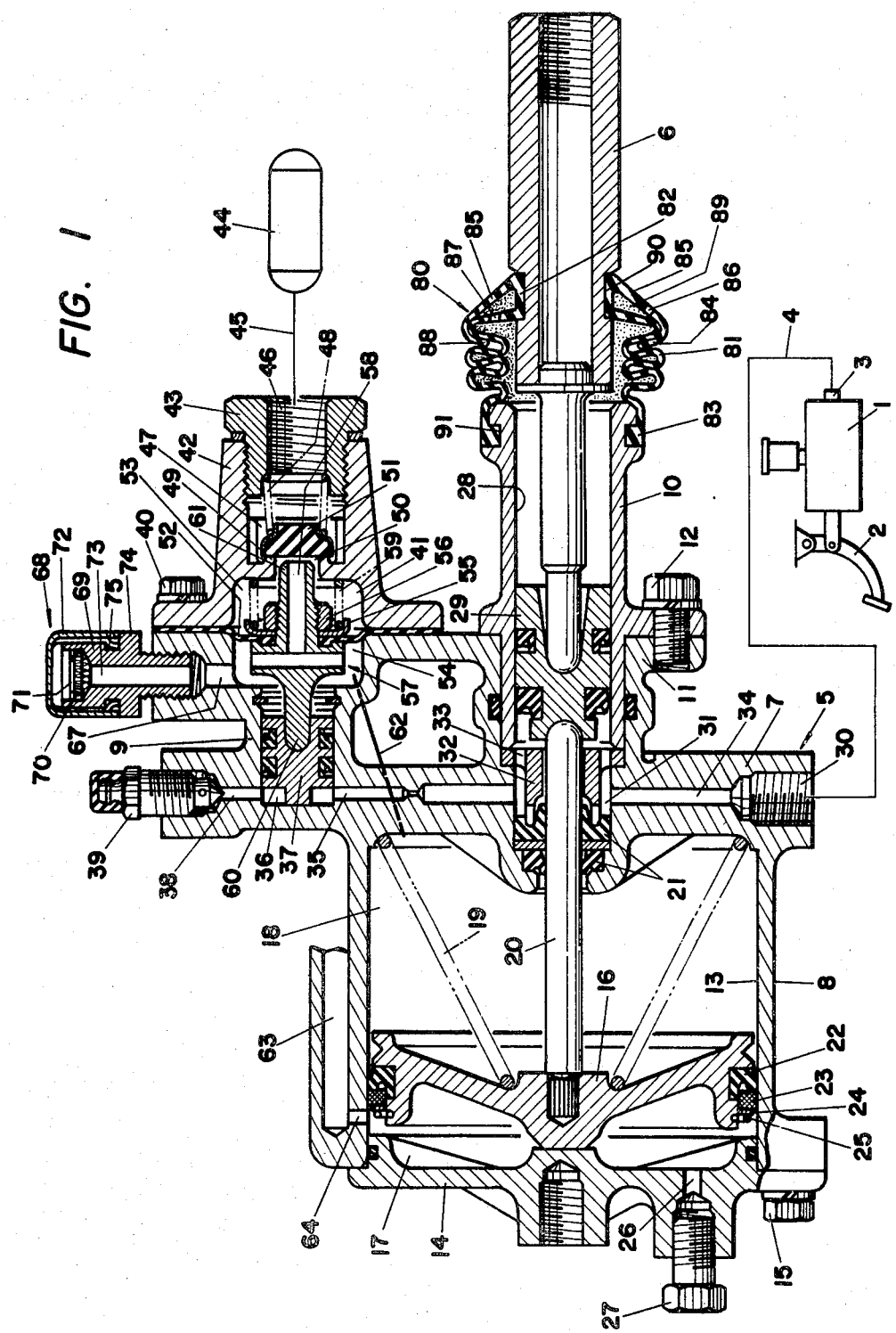
Figure 4:
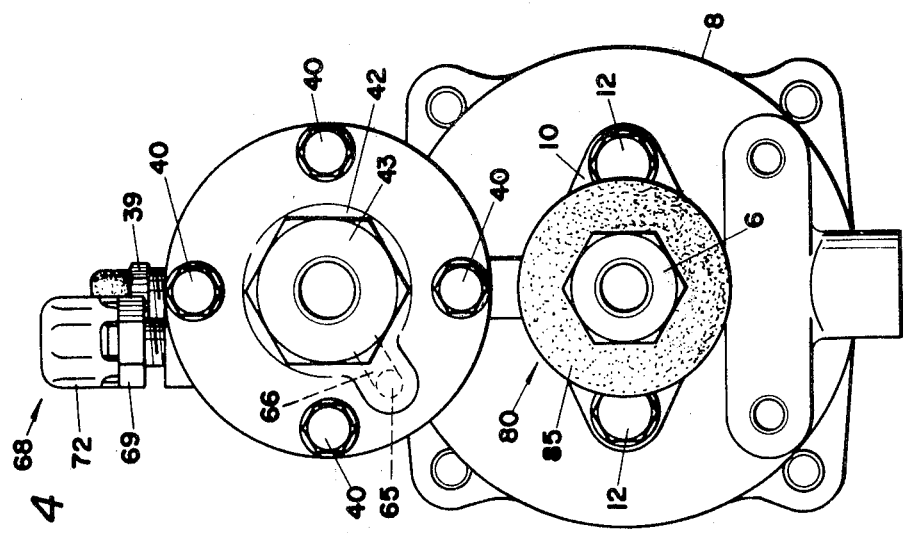
Figure 3:
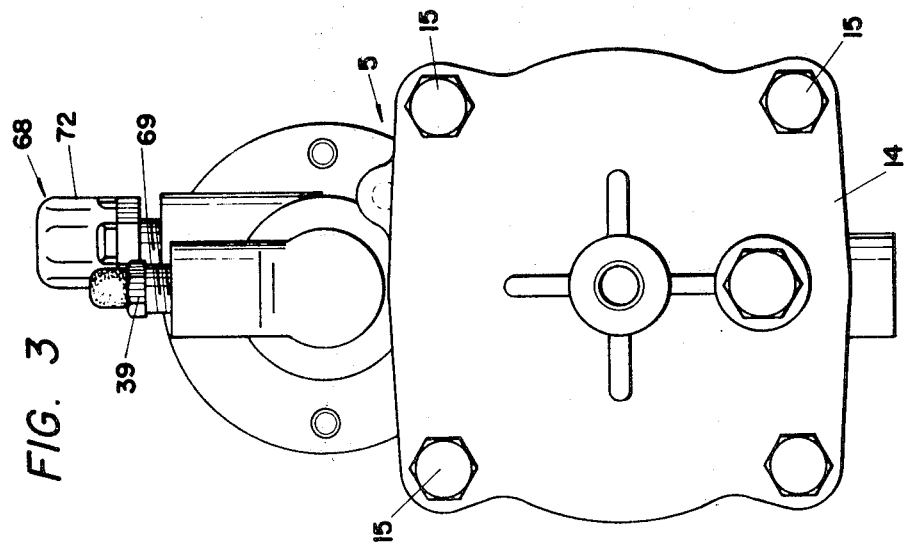
Figure 5:
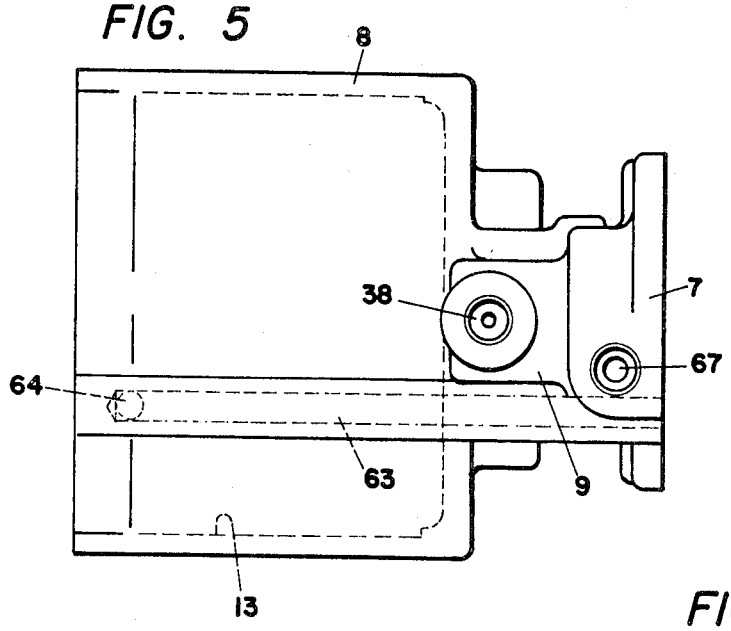
Figure 6:
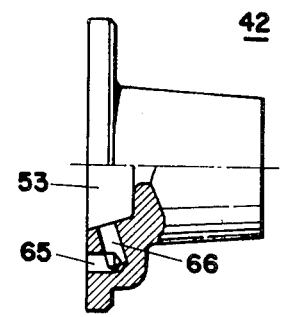

Referring now to the drawings, there is illustrated one embodiment wherein the concept of the present invention is applied to a toggle assembly for the clutxch in vehicles or cars. A master cylinder for the clutch, generally shown at 1, is operable by a clutch pedal 2, the output port 3 of which is connected through a hydraulic passage 4 to a toggle assembly generally shown at 5. An output push rod generally shown by numeral 6 leading to a clutch lever (not illustrated) for engagement or disengagement of the clutch extends from the toggle assembly 5, and is adapted to increase a force exerted by the operation of the clutch pedal 2, which is in turn transmitted to the clutch lever in the manner to be described later.

The aforesaid toggle assembly 5 is an integral unit comprising an end plate 7, a booster shell 8 and a relay valve body 9 formed by casting of an aluminium alloy. A separately formed output cylinder body 10 is bolted at 12 to a portion 11 of the end plate 7 to which the body 10 is fitted. The booster shell 8 extends from the end plate 7 on the side opposite thereto, and is provided on its inner face with a booster cylinder 13 extending successively from the end plate 7. The relay valve body 9 is integrally formed on a portion of the end plate 7 above the portion 11. The booster shell 8 is also fixed at its outer end opening with a cover plate 14 by means of four bolts 15 so as to close it. A booster piston 16 is slidingly mounted within the booster cylinder 13 such as to divide it into half sections, one serving as a back chamber 17 and the other as a front chamber 18. A booster spring 19 is resiliently inserted in between the end plate 7 and the booster piston 16, whereby the booster piston 16 is caused to abut upon the cover plate 14. A push rod for the booster, shown at 20, has its one end fixed at the central portion of the booster piston 16 and its other free end passing alidingly through an oil seal 21 received in the end plate 7.

The booster piston 16 is provided on its outer sliding surface with an annular seal 22 formed of e.g., rubber, and with an annular oil-containing member 23 formed as by felt which can be impregnated with a lubricating oil, said member being kept in contact with one end face of the seal 22. This oil-containing member 23 may be fixed by suitable means. In the embodiment illustrated, a washer 24 and a lock ring 25 are fitted over the booster piston 16 on the outside of the oil-containing member 23.

In assembling, the oil-containing member 23 is sufficiently impregnated with a lubricating oil. Alternatively, the member may be entirely impreganted with the lubricating oil from a supply hole 26 provided in the cover plate 14 due to the permeability. Once the oil-containing member 23 has been impregnated with the lubricating oil in this manner, the lubricating oil remains always supplied on the outer sliding surface of the booster piston 16, since the oil is exposed to the outer sliding surface of the booster piston 16 including the seal 22. This is also because the lubricating oil is coated on the booster cylinder 13 during the reciprocation of the booster piston 16, and undergoes a friction with the outer sliding surface of the booster piston 16.

As a consequence, the outer sliding surface of the booster piston 16 is well lubricated without damaging the seal 22 but with a greater service life. The air-tightness maintained by the seal 22 results in satisfactory performance of the booster cylinder 13.

Usually, the oil supply hole 26 is air-tightly closed as by a bolt 27. A pair of oil-containing member 23 may be provided such that they come in contact with both end faces of the seal 22.

The output cylinder 28 housed within the output cylinder body 10 is slidingly provided with an output piston 29 having its one side adapted to engage with the push rod 20 for the booster mounted in an output cylinder 28 and its other side adapted to engage with one end of the output push rod 6. The end plate 7 is provided with a hydraulic inlet 30 connecting with the oil passage 4 in the master cylinder 1. A hydraulic pressure from the master cylinder 1 through the inlet 30 is admitted into a hydraulic chamber 31 defined by an oil seal 21 and the output piston 29, and acts on the output piston 29 via an oil passage 33 formed in a retainer member 32 for the nil seal 21. The hydraulic pressure is then introduced into a relay cylinder 36 in the relay valve body 9 via a liquid passage 35 diverging from a liquid passage 34 in communication with the hydraulic chamber 31 in the end plate 7. The relay cylinder 36 is slidingly provided therein with a relay piston 37, and is further provided on its port 38 with a bleeder 39.

A casing 42 for a control chamber 41 is fixed to the relay valve body 9 by means of four bolts 40, and is threadedly fitted with an end plug 43. In order to supply an amount of compressed air into the casing 42, a line or conduit 45 is connected thereto, which is associatively conducted to an air tank 44. The end plug 43 is provided with a compressed air inlet 46 in operable communication with a valve-housing chamber 47. The chamber 47 has a control valve 51 which is usually received on a valve seat 49 by the resilient force of a control valve spring 48 and the pressure of the compressed air to close a compressed air passage 50. In fixation of the casing 42 to the relay valve body 9, a diaphragm 52 is interposed between them so that the relay cylinder 36 is arranged coaxially with respect to a control chamber 53 surrounded with the casing 42, the control valve 51 and the diaphragm 52. An atmospheric chamber 54 also surrounded by the relay valve body 9, the relay piston 37 and the diaphragm 52 accommodates therein a valve stem 57 fixed by a nut 56 on the center of the diaphragm 52 through a retainer 55. The valve stem 57 is cruciform in longitudinal section, and has a T-shaped air passage 58 located in the vertical section, and the horizontal section positioned on the side of the chamber 54 is caused to engage with the relay piston 37 by a diaphragm spring 59 to establish communication between the control chamber 53 and the atmospheric chamber 54. When a hydraulic pressure is impressed on the relay piston 37 under such conditions, it advances against the diaphragm spring 59 and causes a valve seat 61 for the valve stem 57 to engage with the control valve 51 until the air passage 58 is closed. When a further push is given to the control valve 51 by the valve seat 61, the valve 51 goes away from the valve seat 49 for the casing 42, thus providing introduction of the compressed air into the control chamber 53 through the compressed air passage 50. Communication is established between the atmospheric chamber 54 and the front chamber 18 of the booster cylinder though a passage 62.

The booster shell 8 is integrally provided on its outer periphery with a compressed air conduit or passage 63 with its one end being operable communication with a vantilation passage 64 in the booster shell 8, which passage is bent in the direction of the booster cylinder 13 and is open in the back chamber 17 of the booster cylinder. The other end of the passage 63 extends through the end plate 7 and has an open end at the extremity of the relay valve body 9. The open end is connected to an air passage 65 provided in the casing 42, said passage 65 being in operable communication with the control chamber 53 via an air passage 66 bending inwardly in the casing 42 and being open in the control chamber 53.

Figure 10:
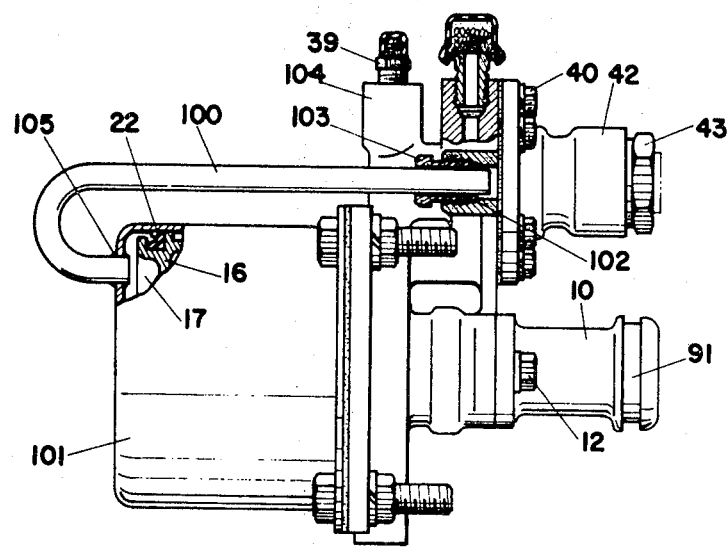
FIG. 10 is a front view, partially cut away, of one typical embodiment of the conventional toggle device designed for vehicles or cars.

In the prior art toggle device equipped with the relay valve of such a type, a compressed air conduit 100 and a booster shell are separately arranged as illustrated in FIG. 10. Consequently, the device is connected to a relay valve body 104 through a O-ring 102 by a joint (bush) 103 for the purpose of making a connection with respect to a control chamber, while it is welded at 105 to the booster shell 101 for the purpose of making a connection with respect to the back chamber 17 of the booster cylinder. This causes that, in the operation of the booster, a compressed air of 6 to 10 kg/cm² enters the control chamber, from which is passes into the back chamber 17 for the booster piston via the conduit 100. This results in a decrease in the sealing property, leading to air leakage. The booster shell 101 formed by press-molding is also inferior in the accuracy of the internal diameter to the body obtained by casting from an aluminium material. This is responsible for a shorter service life of the seal 22.

In the present invention, however, any joints or O-rings for connection of the compressed air passage or conduit are dispensed with and the number of parts is thus limited, since the passage 63 and the booster shell 8 are formed as an integral unit. With such an arrangement, it is possible to prevent a drop of the pressure difference between the control chamber and the working chamber, which may occur due to compressed air leakage. This ensures smooth performance of the clutch and renders it feasible to construct the booster shell 8 and the booster piston 6 from the same material (e.g., an aluminium alloy). As compared with the conventional parts obtained by pres-molding, the present parts excel in the accuracy of the sliding surface and the tolerance of the internal dimension. Thus, the shelf life or durability of the seal 22 is further extended or improved.

It will be noted that the size of the toggle assembly is reduced by keeping the compressed air passage 63 parallel with the center of the booster cylinder 13, as illustrated.

The atmospheric chamber 54 is provided at its suction and exhaust port 67 with an air cleaner 68 comrising a connector 69, a filter 70, a stopper 71 and a cover 72 in the form of a cap.

The connector 69 is threadedly connected to the port 67, and includes an axial ventilation hole 73 in operable communication with said port 67, a peripheral rib 74 formed on the periphery of the intermediate portion and an annular groove 75 provided in the periphery thereof successively leading to the upper portion of the rib 74. The filter 70 is fixed at the upper portion of the ventilation hole 73 by the stopper 71.

Figure 7:
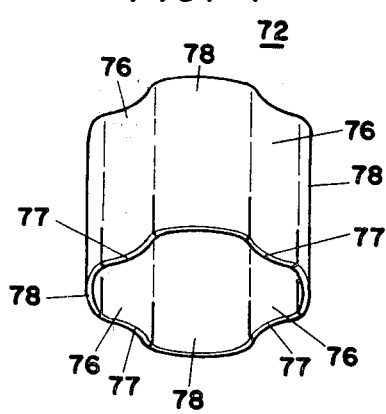
Figure 8:
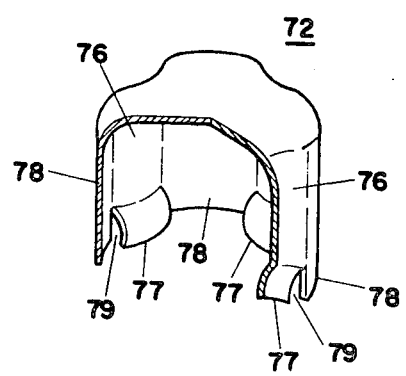

As best shown in FIGS. 7 and 8, the cap-shaped cover 72 has its peripheral wall corrugated in the bus line direction. While the cover 72 is put on the connector 69, the trough portions 76 of such a corrugated wall are caused to engage with the annular groove 75 provided in the connector 69 by caulking of the open ends 77 thereof. Gaps 79 are formed by cleaving of the successively corrugated open ends of the trough and crest portions 76 and 78. The open ends of the crest portions are then in engagement with the peripheral rib 74 of the connector 69.

Figure 11:
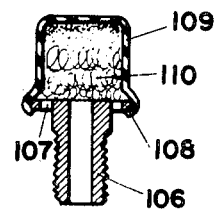
FIG. 11 is a front view, longitudinally sectioned, of one typical embodiment of the prior art air cleaner.

As shown in FIG. 11, the prior art air cleaner typically includes a connector 106 provided at its upper end with a collar 108 having therein a suction and exhaust port 107, a cover 109 having its open end edge foldably bent and fixed to the collar 108, and a filter 110 received within the cover 109. With such an arrangement, it has been found that the exhaust port is easily clogged by mud. Especially in the case of a large-sized vehicle or car, the booster body is mounted on the underside of the car body while being open to the view, so that water, dust and the like upflung by the front wheels enter the suction and exhaust port to cause the filter 110 to be readily clogged. Under such a situation, the compressed air cannot be discharged from the front chamber for the booster piston during release of braking. In addition, the inoperativeness of the booster then interferes with operation of the clutch or increases the force necessary for working the brake pedal. Thus, the prior art air cleaner presents a serious problem in view of safety.

However, the air cleaner 68 according to the present invention is designed to include a ventilation passage defined by the peripheral wall of the connector 69 and the crest portions 68 of the cap-shaped cover 72 and having a sufficient length for preventing entrainment of foreign matters, in particular mus from the outside. The open end of the cover 72 is closed by the peripheral rib 74 and suction and exhaust holes are provided by the laterally opened gaps 79 which are formed in anchoring the cover 72 on the connector 69 by caulking. Thus, entrainment of water and mud upfung from below is effectively prevented. The cap-shaped cover 72, although fixed in the bus direction, is relatively free in the peripheral direction. This ensures that the cover 72 turns due to the vibration or rocking of the car body to remove the mud and the like which tend to be deposited in the gaps. Consequently, the gaps are kept in a well air-permeable state.

A water- and dust-proof boot 80 is provided between the output push rod 6 and the output cylinder body 10.

Figure 9:
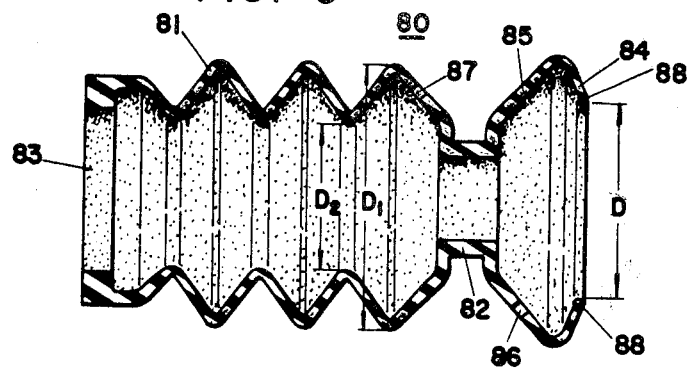

As illustrated in FIG. 9, the whole body of the water- and dust-proof boot 80 is formed of a resilient material as an integral unit, and essentially comprises a bellows section 81, first and second annular fitting portions successively connected with both ends thereof, and a cap-shaped cover 85 extending from the outer end of the first fitting portion 82, with its distal end being reversely bent inwardly at 84. The cover 85 is provided in its part with a first ventilation hole 86, said part corresponding to the lower end of the end wall facing the bellows section 81. Similarly, the bellows section 81 is provided in its part with a second ventilation hole 87, said part corresponding to the upper portion of the end wall facing the cover 85. Further, a reinforcing ball edge 88 is formed on the distal end of the reversely bent portion 84. The internal diameter D of a circle described by the ball edge 88 is smaller than the peak-to-peak diameter $D_1$ of the bellows section, but is larger than the valley-to-valley diameter $D_2$ thereof.

After the boot has been formed as above, the cover 85 is reversely turned toward the bellows section 81, such that its distal ball edge 88 is resiliently allowed to engage closely with the intermediate portion of the first mountain portion of the bellows 81 over its apex to define an annular expansion chamber 89 around the first fitting portion 82. The expansion chamber 89 is in communication with the atmosphere and the interior of the bellows section 81 by way of the first and second ventilation holes 86 and 87. In other words, the interior of the bellows 81 is in communication with the atmosphere via the expansion chamber 89.

In mounting of the boot 80, the first and second fitting portions 82 and 83 are closely fitted into a groove 90 formed in the outer surface of the output push rod 6 and a groove 91 in the outer surface of the output cylinder body 10, respectively, in a resilient manner.

Consequently, the axial reciprocation of the output push rod 6 causes extension and contraction of the bellows 81, so that breathing communication between the interior of the bellows 81 and the atmosphere is established through the first ventilation hole 86, the expansion chamber 89 and the second ventilation hole 87, thereby preventing abnormal deformation or destruction of the bellows 81. During such breathing communication, rainwater, dust and the like may enter the first ventilation hole 86; however, they do not reach the upper second ventilation hole 87 since their entrance is limited in the expansion chamber 89. Accordingly, no entrance of rainwater, dust and the like into the bellows 81 takes place, thus preventing the interior of the output cylinder 28 from being rusted and spoiled.

In addition, the expansion chamber 89 is formed by making a resiliently close engagement between the bellows 81 and the distal end of the cap-shaped cover 85 extending from the fitting portions of the bellows 81. Therefore, the overall configuration of the boot is relatively simple in an extended state where the cover 85 is apart from the bellows 81. This ensures that the boot is inexpensively manufactured and thus put on the market at a cheaper price. Moreover, since the junction between the cover 85 and the bellows 81 shows a satisfactory sealing property, any entrainment of foreign matters therefrom is positively avoided.

Reference will now be made to the operation of the toggle assembly according to the present invention.

During the engagement of the clutch, the control chamber 53, the atmospheric chamber 54 and the front and back chambers 17 and 18 for the booster piston are open to the atmosphere through the suction and exhaust port 67 and the ventilation hole 73 in the air cleaner 68 by way of the passage 58 in the valve stem 57, the air passage 66 and 65 and the compressed air conduit 63 as well as the ventilation passages 64 and 62. The chamber 47 for receiving the valve is supplied with compressed air from the air tank 44.

Working the clutch pedal 2, the output hydraulic pressure from the master cylinder 1 is admitted into the hydraulic chamber 31 from the hydraulic intake 30 to apply it on the output piston 29, while a part of the hydraulic pressure is bypassed into the liquid passage 35 and enters the relay cylinder 36 to apply it on the back of the relay piston 37.

When the hydraulic pressure is impressed on the back of the relay piston 37 in this way, the piston 37 advances within the relay cylinder 36 to push the valve stem 57, the valve seat 61 of which in turn engage with the control valve 51, whereby the air passage 58 is closed. Such engagement cuts off communication between the control chamber 53 and the atmospheric chamber 54, so that the communication of the back chamber 17 of the booster cylinder 13 with the atmosphere is interrupted.

Subsequent advance of the relay piston 37 allows the control valve 51 to be forced by the seat valve 61 of the valve stem 57 against the forces produced by the control valve spring 48 and the compressed air, so that it goes away from the valve seat 49 to provide opening of the compressed air passage 56.

Thus, the compressed air enters the control chamber 53, and passes through the air passages 66 and 65 in the casing 42 into the back chamber 17 of the booster cylinder 13 via the compressed air passage 63 and then the ventilation passage 64.

The compressed air introduced into the back chamber 17 for the booster piston then causes the atmosphere present in the front chamber 18 for the booster piston to be discharged from the air cleaner 68 through the passage 62 and the atmospheric chamber 54 in the relay value body 9 according to the advance of the booster piston 16 but against the resilient force of the booster spring 19.

A pressure boosted or increased by the advancement of the booster piston 16 applies a force on the output piston 29 in the output cylinder 28 via the push rod 20 for the booster. Thus, the thrust forces exerted by the booster piston 16 and applied directly in the hydraulic chamber 31, and gives a force to the output rod 6 to cause operation of a clutch lever (not shown), whereby disengagement of the clutch is attained.

Upon release of a force working the clutch pedal 2, there is a decrease in the pressure in the hydraulic chamber 31 and the back pressure of the relay piston 37 in the relay cylinder 36. As a consequence, the valve stem 57 goes back under the resilient force of the diaphragm sring 59 while affording a force to the relay piston 37, and then engages with the valve seat 49 under the action of the control value spring 48, whereby the compressed air passage 50 is closed. The valve stem 57 makes a further backward movement under the resilient force of the diaphragm spring 59, so that its valve seat 61 parts from the control valve 51, whereby the control chamber 53 is kept in communication with the atmospheric chamber 54 by way of the air passage 58. Thus, the compressed air present in the back chamber 17 for the booster piston flows back to the control chamber 53 through the air passage 64, the compressed air passage 63, and the air passages 65 and 66 in the manner opposite to the foregoing. The compressed air then flows through the air passage 58 into the atmospheric chamber 54, from which it is discharged. The booster piston 16 goes back to a position where it abuts upon the cover plate 14 under the resilient force of the booster piston 19, with the result that the force exerted on the output piston 19 disappears along with the compressive force in the hydraulic chamber 31. Thus, the clutch is restored to a position where its engagement is again attained.

It will be noted that a reduction in the weight of the overall toggle assembly is achieved by casting from a light alloy, e.g., an aluminum alloy the end plate 7 having as an integral piece the booster shell 8, the relay valve body 9 and the output cylinder mounting portion 11, the cover plate 14, booster piston 16, the casing 42 for the control chamber 53 and the output cylinder body 10.

It will be understood from the foregoing explanation that, according to the present invention, the booster body is integrally provided therein with the compressed air passage for establishing communication between the control chamber and the back chamber for the booster piston, thus eliminating the need of any joints or O-rings for connection of a compressed air conduct. This results in a decrease in the number of the parts involved, and ensures that a drop of the pressure difference between the control chamber and the back chamber for the booster piston is avoided to permit satisfactorily smooth operation of the clutch. Further, the present invention renders it possible to make the booster body out of the same material as used in the booster body(e.g., an aluminium alloy) by casting. The booster body thus obtained is superior in the accuracy of the sliding surface and the tolerance of the internal dimension to that made by press-molding, thus making further improvements in the shelf life or durability of the annular seal used for the booster piston. The lubricating oil thus coated undergoes a friction with respect to the outer sliding surface of the booster piston, so that the lubricating oil remains constantly supplied on the sliding surface. Thus, the outer sliding surface of the booster piston is well lubricated without damaging the annular seal but with great improvements in the durability thereof. The air-tightness maintained by the annular seal results in satisfactory performance of the booster cylinder. Moreover, the air cleaner has an air passage of a sufficient length defined by the peripheral wall of the connector and the crest portions of the cover, so that no entrainment of foreign matters, particularly mud from the outside takes place. The open end of the cover is closed by the laterally opened gaps which are formed in anchoring the cover on the connector by caulking, so that no entrainment of water and mud upflung from below takes place. Moreover, the cover, although fixed in the bus direction, is designed to be relatively free in the peripheral direction. This ensures that the cover turns due to the vibration or rocking of the car body to remove mud and so on which tend to be deposited in the gaps, thus keeping them in a well air-permeable state.

Since the interior of the bellows forming part of the water-and dust-proof boot is kept in communication with the atmosphere through the expansion chamber and the first and second vantilation holes positioned before and after said chamber, entrance of foreign matters such as rainwater and dust from the outside, which may occur during the extension and contraction of the bellows, it interrupted in the expansion and chamber, so that they do not reach the bellows at all. This further ensures that the sliding portion between the output cylinder and the output push rod is prevented from getting rusted or spoiled. Furthermore, the expansion chamber is formed by making a resiliently close engagement between the bellows and the distal end of the cap-shaped cover extending from the fitting portions of the bellows. As a result, the overall configuration of the boot is relatively simple in an extended state where the cover is apart from the bellows. This ensures that the boot is inexpensively manufactured and thus put on the market at a cheaper price. Moreover, since the junction between the cover and the bellows possesses a good sealing property, entrance of foreign matters therefrom are surely avoided.

While the present invention has been explained with reference to the particular embodiments, it will be understood that various changes or modifications may be made without departing from the sprit and scope of the present invention. Accordingly, such changes or modifications are intended to fall within the scope and sprit of the appended claims.

What is claimed is:

1. A toggle assembly for vehicles or cars comprising a relay cylinder mounted on an end plate including a booster cylinder and an output cylinder, a control chmber arranged in coaxial relation to the relay cylinder, a control valve for controlling a gas by a hydraulic pressure of a master cylinder, said valve being arranged in operable association with the control chamber, and a booster piston disposed in the booster cylinder and in operable association with the controlled gas, wherein said end plate is provided with a shell for said booster cylinder as an integral piece, said booster piston dividing said booster cylinder into a front chamber between the piston and the end plate and a back chamber between the piston and the end of the booster cylinder opposite the end plate, said shell is integrally provided with a first compressed air passage having its one end being open in the back chamber of the booster cylinder for the booster piston and its other end passing through said end plate and being open at the end of a relay valve body, and a second compressed air passage is provided to extend from a casing for said control chamber, said second passage having its one end in communication with the other open end of said first passage and its other end in communication with said control chamber, and wherein a water- and dust-proof boot is interposed between the output push rod and the output cylinder body, said boot including a bellows section disposed for making a connection between first and second portions to which are fitted the output push rod and the output cylinder body, respectively, and a cover section provided to extend from said first portion such that the distal end thereof is brought in resiliently close contact with a crest portion of said bellows section to define an annular expansion chamber around the outer surface of said first portion, the respective end walls of said bellows and cover sections facing each other through said expansion chamber being provided therein with ventilation holes.

2. A toggle assembly for vehicles or cars comprising a relay cylinder mounted on an end plate including a booster cylinder and an output cylinder, a cover plate on said booster cylinder at the end opposite said end plate, a control chamber arranged in coaxial relation to the relay cylinder, a control valve for controlling a gas by a hydraulic pressure of a master cylinder, said valve being arranged in opposite association with the control chamber, and a booster piston disposed in the booster cylinder dividing the same into a front chamber between the piston and the end plate and a back chamber between the piston and the cover plate and in operable association with the controlled gas, wherein said end plate is provided with a shell for said booster cylinder as an integral piece, said shell is integrally provided with a first compressed air passage having its one end being open in the back chamber of the booster cylinder for the booster piston and its other end passing through said end plate and being open at the end of a relay valve body, and a second compressed air passage is provided to extend from a casing for said control chamber, said second passage having its one end in communication with the other open end of said first passage and its other end in communication with said control chamber, wherein an annular oil-containing member impregnated with a lubricating oil is disposed on the outer sliding surface of said booster piston at a position adjacent to an annular seal and an oil supply hole is provided in said cover plate, wherein a rib is formed on the periphery of an intermediate portion of a connector provided therein with a ventilation hole having a filter while an annular groove is formed in a peripheral portion of the connector above said peripheral rib, a cap-shaped cover being disposed over said connector, the peripheral wall of the cap-shaped cover is axially corrugated, said cover is put on said connector to cause the open ends of the trough portions of said corrugated wall to engage with said annular groove by caulking, gaps are formed in the successively corrugated wall of the open end of said cover by cleaving while the open ends of the crest portions are made to engage with peripheral rib of said connector, and said connector is mounted at a suction and exhaust port in the relay cylinder, wherein a water-and-dust-proof boot is interposed between the output push rod and the output cylinder body, said boot including a bellows section disposed for making a connection between first and second portions to which are fitted the output push rod and the output cylinder body, respectively, and a cover section provided to extend from said first portion such that the distal end thereof is brought in resiliently close contact with a crest portion of said bellows section to define an annular expansion chamber around the outer surface of said first portion, the respective end walls of said bellows and cover sections facing each other through said expansion chamber being provided therein with ventilation holes.

3. A toggle assembly for vehicles or cars as recited in claim 2, wherein said first compressed air passage mounted on said booster cylinder shell is kept parallel with the center axis of said booster cylinder.

4. A toggle assembly for vehicles or cars as recited in claim 2, wherein said end plate includes as an integral piece said booster cylinder, an output cylinder fitting portion and a relay cylinder body, a cover plate for closing the end of said booster cylinder shell opposite said end plate, said booster piston, a casing for said control chamber and an output cylinder body are formed of an aluminium alloy casting.

* * * * *